April 12, 1932.  R. J. ROGERS  1,853,576
SEMITRAILER
Filed Sept. 13, 1930   2 Sheets-Sheet 1
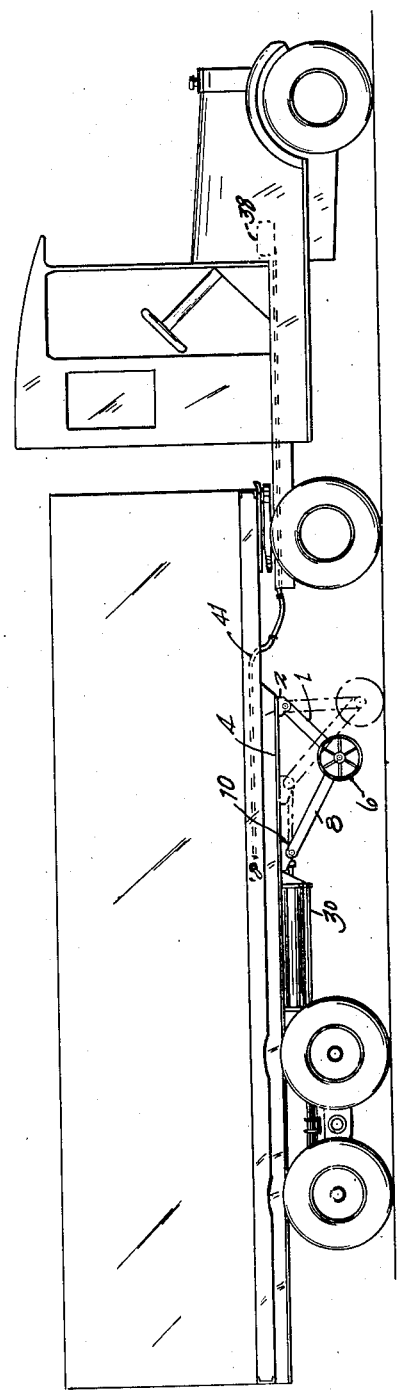
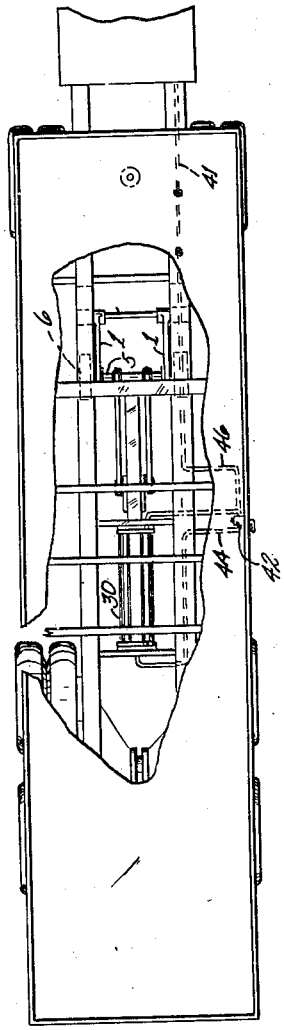
Inventor
Russell J. Rogers,
By Justin W. Macklin,
his Attorney April 12, 1932.  R. J. ROGERS  1,853,576
SEMITRAILER
Filed Sept. 13, 1930   2 Sheets-Sheet 2
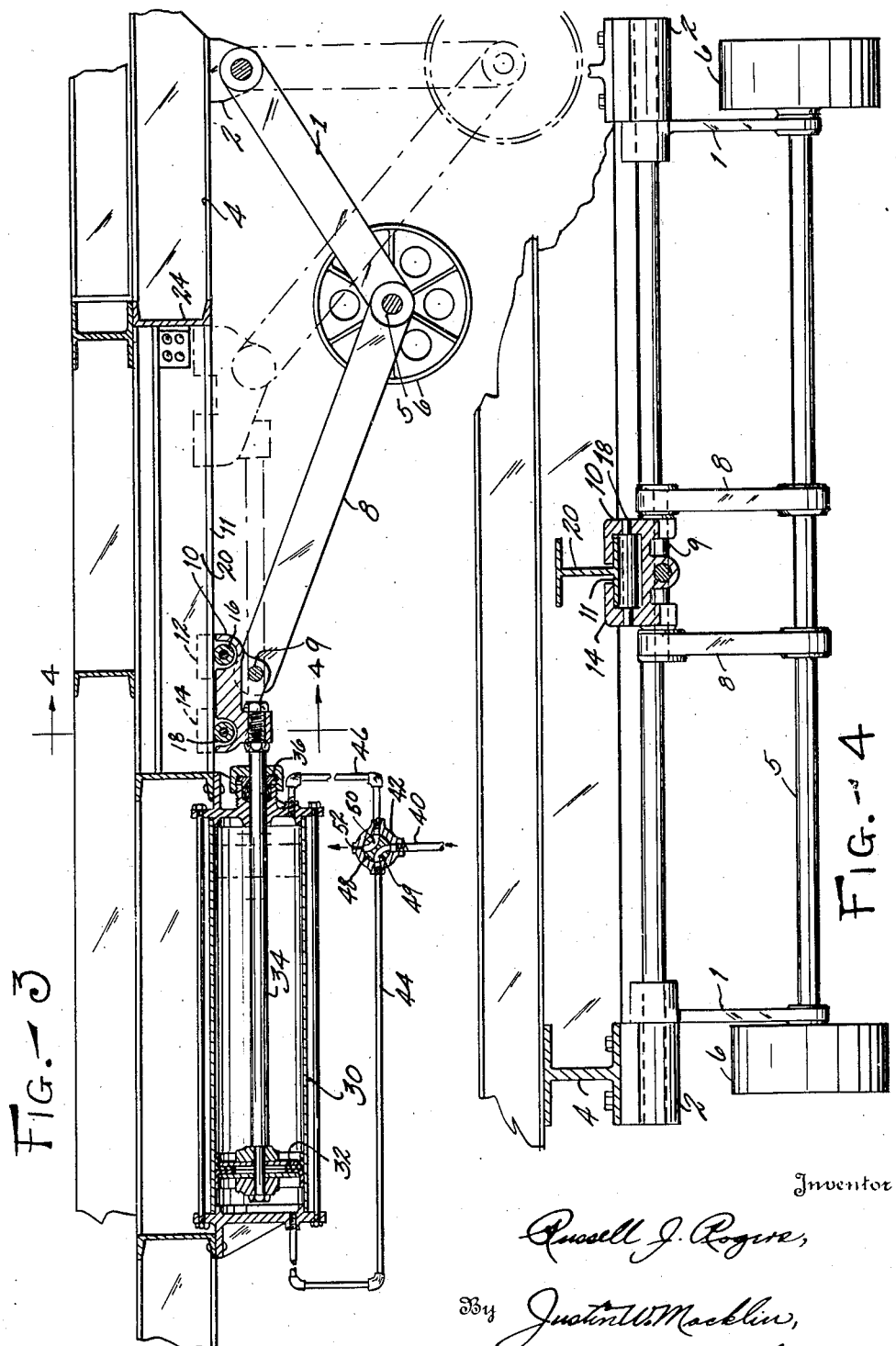
Inventor
Russell J. Rogers,
By Justin W. Macklin,
his Attorney.

Patented Apr. 12, 1932

1,853,576

UNITED STATES PATENT OFFICE

RUSSELL J. ROGERS, OF ALBION, PENNSYLVANIA, ASSIGNOR TO ROGERS BROS. CORPORATION, OF ALBION, PENNSYLVANIA, A CORPORATION OF PENNSYLVANIA

SEMITRAILER

Application filed September 13, 1930. Serial No. 481,665.

This invention relates to improvements in semi-trailers and is particularly concerned with a front end carriage for supporting the front end of the trailer body when the trailer is unattached to a truck or other tractor means and for retaining the trailer body in the normal horizontal position for loading and unloading.

In the present so-called types of semi-trailers, the usual front end supports comprise pivotal legs and small wheels mounted on the lower ends thereof. Most of these supports are operated manually through worm gears and cranks or through hydraulic pistons operable consequent upon the relative movement between the trailer and automotive truck. Since the present types of supports require manual operation by the operator of the truck much inconvenience and loss of time results from their operation especially where several trailers are connected to form a train, as each trailer requires individual attention.

My invention contemplates an operating mechanism for such front end supports which is simple and effective in operation, economical to manufacture and easy to install, and which may be operated either at the trailer or from the driving seat of the truck.

Another advantage of my operating mechanism is that it is positive in action, both for lifting and lowering the front end support of the trailer, and is of sufficient strength to lift the front end of the trailer higher than its normal position on the truck, even under comparatively heavy loads.

Another advantage and object of my invention is that the supports of any number of trailers forming a train may be operated concurrently and easily, and the supports may be held firmly in operating or idle position.

Other objects of my invention will become apparent from the following specification.

In the drawings,

Fig. 1 is a side elevation of a truck and trailer embodying my invention.

Fig. 2 is a partial plan view of the trailer illustrated in Fig. 1.

Fig. 3 is an enlarged longitudinal sectional view of a portion of the trailer illustrated in Figs. 1 and 2, showing my invention in greater detail.

Fig. 4 is an enlarged cross sectional view taken on a plane indicated by the line 4—4 of Fig. 3.

In the form illustrated, my invention includes two or more transversely spaced legs 1 pivotally mounted at one end in brackets 2 on longitudinal frame members 4 of the trailer. At the other or free end of each leg is an axle 5 carrying a supporting wheel 6, which is adapted to swing in an arc about the pivot point of the leg. Pivotally secured to each of the legs 1, for instance, to the axle 5 is an operating arm or lever 8. The other end of each of the levers is pivoted on a trunnion or cross shaft 9 on the body 10 of a carriage. The carriage is slidable longitudinally of the trailer along a track 11.

As illustrated, this carriage may include a body 10 provided with lugs 12 and 14 which engage tracks rigidly secured to the trailer frame. Rollers, such as 16 and 18, may be provided to engage the underside of the track to render operation of the carriage free and easy. An economical track may comprise a longitudinally extending I-beam 20 secured by its ends or otherwise to the trailer frame, and having its lower flanges machined for a sliding fit with the lugs 12 and 14 respectively. Obviously, upon movement of the carriage 10 from the rearward position shown in Fig. 3 to forward position designated by the dotted lines, the levers 8 raise and lower the wheels 6. In the extreme forward position of the carriage 10, the wheel 6 is advanced far enough to position its axis somewhat forward of the pivotal connection of the leg 1 in the bracket 2, so that the weight of the trailer tends to force the wheel forward and draw the carriage more tightly against a suitable stop, such as a frame member 24 at the forward end of the track 11. In this manner the weight of the trailer tends to retain the front end support in operating position.

The present practice in regard to the braking of trailers is the utilization of air pressure operated brakes, air lines being provided on each trailer with flexible couplings for connecting the trailer with a compressor and air tank on the truck to permit braking any number of trailers on a given train concurrently. The compressors and tanks used for operation of these brakes are usually of greater capacity than the amount actually needed for brake operation. Consequently at very little additional expense, I utilize air pressure for operating the carriage 10.

A convenient manner of operating the carriage 10 is by means of an air cylinder 30, rigidly secured to the trailer frame. Mounted within the cylinder 30 is a reciprocable piston 32 provided with a piston rod 34 extending outside of the cylinder, the piston rod passage being sealed by a suitable packing, as indicated at 36. As illustrated, I prefer to place the cylinder longitudinally of the truck and directly connect the piston rod 34 to the carriage 10. Obviously, however, various lever or other arrangements may be provided to increase the speed or power transmitted to the carriage 10 and to permit repositioning of the various parts.

In order to actuate the piston, I provide a conduit or air line 40 which communicates with a main feed line 41 leading from a compressor 38 or a compressed air tank on the truck. The conduit 40 opens into a valve body 42 which communicates with conduits 44 and 46. The conduit 44 provides the passageway into the cylinder 30 on one side of the piston 32 and the conduit 46 provides the passageway on the other side. These conduits preferably open into the cylinder at the ends, as illustrated.

A simple and effective valve may include a plug 48 provided with passageways 49 and 50 extending through the plug, each having its entrance and exit openings at adjacent quarter points about the plug respectively. In the valve body diametrically opposite to the opening of the conduit 40 is a small opening or bleeder 52. When it is desired to lower the wheels 6, the valve is opened, as illustrated in Fig. 3, and air under pressure passes through the valve passage 48 and conduit 44 into the cylinder 30 on the left of the piston. In this position of the valve plug, the conduit 46 communicates with the passage 50 and through this passage with the bleeder 52.

Thus pressure is built up within the cylinder at the left of the piston and relieved on the right so that the piston is forced to the right, moving the carriage forward and lowering the wheels 6. Obviously by turning the plug 48 so that the passage 49 communicates the conduits 40 and 46 and the passage 50 communicates the conduit 44 and the bleeder 52, the pressure is relieved on the left end of the piston and discharged through the bleeder and the air from the conduit 40 builds up pressure on the right of the piston, moving it to the left to raise the wheels 6. By turning the plug intermediate these positions both the conduits 44 and 46 are sealed by the plug and the wheels are retained in a given position.

I prefer to use air pressure for operating my front end supporting truck, since it requires little extra equipment, but I do not mean to limit myself to differential air pressure for raising and lowering the wheels 6, as obviously liquids or other fluids may be used.

By way of illustration, I have shown the valve 42 as positioned on the trailer. This is especially desirable with trailers which are equipped with air brakes, as in such cases, each trailer is provided with an air pressure line, fitted at each end with flexible couplings for operably connecting each trailer with a common source of supply. In trailers so equipped, the conduit 40 may be tapped into such feed line. However, this may be positioned at any convenient place, for instance, on the truck, where it can be operated from the driver's seat, and thus a large train including several trailers may be operated concurrently without necessitating the driver leaving the seat of the truck.

If the single control valve on the truck is used, obviously each of the conduits 44 and 46 may be tapped into separate main feed lines, respectively, which extend entirely along the trailer. Each main feed line should be provided at each end with flexible couplings so that it may be connected with corresponding lines on adjacent trailers in the train, the unconnected end of the lines of the last trailer being sealed. Thus, upon operation of the valve, as described, each main feed line would act to deliver pressure to all of the cylinders when the valve was in one position and would act as a discharge line to the valve bleeder 52 when the position of the valve was reversed.

While various other arrangements of the legs 1 and arms 8 may be made, I find the arrangement illustrated very efficient, as the greatest forward or rearward thrust transmitted to the wheels from the longitudinally moving carriage 10 is obtained during the movement of the wheels from a distance slightly above the ground past the extreme downward position, at which time the front end supporting truck may be lifting the front end of the trailer. The power required to operate the legs or supporting truck when the wheels are out of engagement with the ground is, of course, very small.

By the use of the apparatus shown, sufficient power can easily be developed to raise the front end of the trailer when loaded, thus lifting it out of engagement with the truck or preceding trailer in the train, if desired.

While by way of illustration I have described the above apparatus as utilizing air or fluid above atmospheric or normal pressure, the usual vacuum system may be used to actuate the piston instead. In such case the operating cylinder and plunger would necessarily be somewhat larger for the same amount of power and a vacuum pump and tank instead of a fluid compressor would be used as a source of power. The adaptation of the system to such vacuum operation is obvious. When, in the specification and claims, I speak of fluid pressures for actuating the piston, I do not mean to limit myself to fluids above atmospheric pressure, but mean to include as well fluid at atmospheric pressure on one side of the piston, operating by virtue of the reduced pressure or vacuum on the opposite side.

I claim:

1. In a tractor and trailer combination, supporting legs for said trailer movable relative thereto to a raised position and to a lowered position for engaging a supporting surface, a source of fluid under pressure on one of said vehicles, a conduit communicating therewith, a cylinder on said trailer, a plunger reciprocable within said cylinder and operably connected to said legs, a manually operated valve adapted for selectively communicating said conduit with said cylinder on either side of said plunger and venting said cylinder on the opposite side of said plunger concurrently whereby the plunger may be reciprocated to raise and lower said legs.

2. A semi-trailer having a movable front end supporting truck, a cylinder on said trailer, a reciprocable plunger in said cylinder, means actuated by said reciprocable plunger to move said truck, conduits on said trailer communicating with said cylinder, one on one side of said plunger and one on the opposite side thereof, a valve in said conduit line communicating one of said conduits with a source of fluid under pressure and the other with fluid under less pressure in one position of said valve and reversing said communication in another position of said valve whereby said plunger may be reciprocated to raise and lower said supporting truck, said valve sealing both of said conduits in a neutral position to retain said movable support in a given position.

3. The combination with a vehicle having a support adapted to be moved into and out of supporting position, of pneumatic pressure means to actuate said support, said means including a cylinder, a plunger reciprocable therein and operably engaging said support, manually operable valve means for communicating said cylinder on one side of said plunger with the atmosphere and on the opposite side of said plunger with a source of fluid under different pressure in one position of said valve means and for reversing said communications in another position of said valve means whereby said plunger may be positively moved in each direction by fluid pressure and the support moved to predetermined positions.

4. In a semi-trailer, a support for the front end of said trailer movable relative thereto and means to move said support to predetermined positions, said means including a cylinder and a plunger reciprocable therein, one of said members being operably connected to said support and the other being secured to said vehicle, means for storing fluid under substantially constant pressure, manually operable valve means for communicating said fluid storing means with said cylinder at either side of said plunger selectively and for concurrently communicating the cylinder at the opposite side of the plunger with fluid under pressure different from said source whereby said plunger is reciprocated and by fluid pressure in each direction said support moved to predetermined positions.

In testimony whereof, I hereunto affix my signature.

RUSSELL J. ROGERS.